US012609450B2

(12) United States Patent
Huang et al.

(10) Patent No.: US 12,609,450 B2
(45) Date of Patent: Apr. 21, 2026

(54) ANTENNA SYSTEM

(71) Applicant: Wistron NeWeb Corp., Hsinchu (TW)

(72) Inventors: Chin-Lien Huang, Hsinchu (TW); Wen-Tai Tseng, Hsinchu (TW); Kuo-Jen Lai, Hsinchu (TW)

(73) Assignee: WISTRON NEWEB CORP, Hsinchu (TW)

( * ) Notice: Subject to any disclaimer, the term of this patent is extended or adjusted under 35 U.S.C. 154(b) by 91 days.

(21) Appl. No.: 18/417,029

(22) Filed: Jan. 19, 2024

(65) Prior Publication Data

US 2024/0304997 A1 Sep. 12, 2024

(30) Foreign Application Priority Data

Mar. 8, 2023 (TW) ................................ 112108508

(51) Int. Cl.
*H01Q 1/36* (2006.01)
*H01Q 1/48* (2006.01)
*H01Q 5/30* (2015.01)
*H01Q 9/04* (2006.01)
*H01Q 1/24* (2006.01)

(52) U.S. Cl.
CPC ............. *H01Q 9/0421* (2013.01); *H01Q 1/48* (2013.01); *H01Q 5/30* (2015.01); *H01Q 1/243* (2013.01)

(58) Field of Classification Search
CPC .......... H01Q 9/0421; H01Q 1/48; H01Q 5/30; H01Q 1/243; H01Q 9/42; H01Q 5/371
See application file for complete search history.

(56) References Cited

U.S. PATENT DOCUMENTS 9,673,512 B2 6/2017 Lin
10,454,156 B1 * 10/2019 Yang ........................ H01Q 1/48
11,600,921 B1 * 3/2023 Chen ...................... H01Q 5/357
2008/0094283 A1 * 4/2008 Mei ........................ H01Q 9/285 343/700 MS
2010/0156745 A1 * 6/2010 Andrenko .............. H01Q 13/10 343/848
2012/0218164 A1 * 8/2012 Jeng ..................... H01Q 9/0421 343/848

(Continued)

FOREIGN PATENT DOCUMENTS

CN 112134005 A * 12/2020 ............. H01Q 9/285
CN 114094325 A * 2/2022 ......... H01Q 21/0006

(Continued)

*Primary Examiner* — Dimary S Lopez Cruz
*Assistant Examiner* — Bamidele A Immanuel
(74) *Attorney, Agent, or Firm* — McClure, Qualey & Rodack, LLP

(57) ABSTRACT

An antenna system includes a first antenna structure which includes a first ground element, a first radiation element, a second radiation element, and a third radiation element. The first radiation element is coupled to the first ground element. A region is defined by the first ground element and the first radiation element. The second radiation element has a first feeding point. The second radiation element is adjacent to the first radiation element. The third radiation element is coupled to the first feeding point. The third radiation element is adjacent to the first ground element. The second radiation element and the third radiation element are disposed inside the aforementioned region.

17 Claims, 8 Drawing Sheets

(56) References Cited

U.S. PATENT DOCUMENTS

| | | | | |
|---|---|---|---|---|
| 2014/0313089 | A1* | 10/2014 | Wu | H01Q 21/28 343/893 |
| 2015/0200456 | A1* | 7/2015 | You | H01Q 9/42 343/750 |
| 2016/0156097 | A1* | 6/2016 | Kobayashi | H01Q 9/42 343/718 |
| 2016/0164192 | A1* | 6/2016 | Lin | H01Q 5/314 343/749 |
| 2017/0207542 | A1* | 7/2017 | Tseng | H01Q 1/48 |
| 2017/0317419 | A1* | 11/2017 | Wu | H01Q 9/0421 |
| 2018/0048076 | A1* | 2/2018 | Wei | H01Q 21/30 |
| 2018/0219292 | A1* | 8/2018 | Kenkel | H01Q 5/30 |
| 2019/0198975 | A1* | 6/2019 | Chen | H01Q 9/42 |
| 2020/0185813 | A1* | 6/2020 | Chang | H01Q 1/48 |
| 2020/0313308 | A1* | 10/2020 | Chang | H01Q 1/2266 |
| 2021/0013607 | A1* | 1/2021 | Tai | H01Q 1/48 |
| 2021/0126343 | A1* | 4/2021 | Chang | H01Q 5/335 |
| 2021/0167504 | A1* | 6/2021 | Yu | H01Q 9/045 |
| 2021/0313692 | A1* | 10/2021 | Tai | H01Q 9/0407 |
| 2022/0085483 | A1* | 3/2022 | Chang | H01Q 5/307 |
| 2022/0302590 | A1* | 9/2022 | Liang | H01Q 1/48 |
| 2022/0399907 | A1* | 12/2022 | Wei | H01Q 1/48 |
| 2023/0028988 | A1* | 1/2023 | Li | H01Q 5/371 |
| 2023/0107295 | A1* | 4/2023 | Chang | H01Q 1/2266 343/720 |
| 2023/0163455 | A1* | 5/2023 | Chang | H01Q 5/378 343/848 |
| 2023/0223689 | A1* | 7/2023 | Yang | H01Q 5/307 343/846 |
| 2023/0411845 | A1* | 12/2023 | Chang | H01Q 9/42 |
| 2024/0097330 | A1* | 3/2024 | Lo | H01Q 9/42 |
| 2024/0128642 | A1* | 4/2024 | Sun | H01Q 9/42 |
| 2024/0313419 | A1* | 9/2024 | Lin | H01Q 1/521 |

FOREIGN PATENT DOCUMENTS

| | | | | | |
|---|---|---|---|---|---|
| KR | 20080029594 | A | * | 4/2008 | H01Q 5/378 |
| KR | 20080051310 | A | * | 6/2008 | H01Q 1/243 |
| KR | 20090032157 | A | * | 4/2009 | H01Q 5/385 |
| TW | 201622248 | A | | 6/2016 | |
| TW | 202211544 | A | * | 3/2022 | H01Q 1/36 |

* cited by examiner

100(110)

300

ANTENNA SYSTEM

CROSS REFERENCE TO RELATED APPLICATIONS

This application claims priority of Taiwan Patent Application No. 112108508 filed on Mar. 8, 2023, the entirety of which is incorporated by reference herein.

BACKGROUND OF THE INVENTION

Field of the Invention

The disclosure generally relates to an antenna system, and more particularly, to a wideband antenna system.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHZ, 850 MHz, 900 MHz, 1800 MHZ, 1900 MHZ, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna used for signal reception and transmission has insufficient bandwidth, it will negatively affect the communication quality of the mobile device in which it is installed. Accordingly, it has become a critical challenge for antenna designers to design a small-size, wideband antenna system.

BRIEF SUMMARY OF THE INVENTION

In an exemplary embodiment, the invention is directed to an antenna system that includes a first antenna structure. The first antenna structure includes a first ground element, a first radiation element, a second radiation element, and a third radiation element. The first radiation element is coupled to the first ground element. A region is defined by the first ground element and the first radiation element. The second radiation element has a first feeding point. The second radiation element is adjacent to the first radiation element. The third radiation element is coupled to the first feeding point. The third radiation element is adjacent to the first ground element. The second radiation element and the third radiation element are disposed inside the region.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1A:
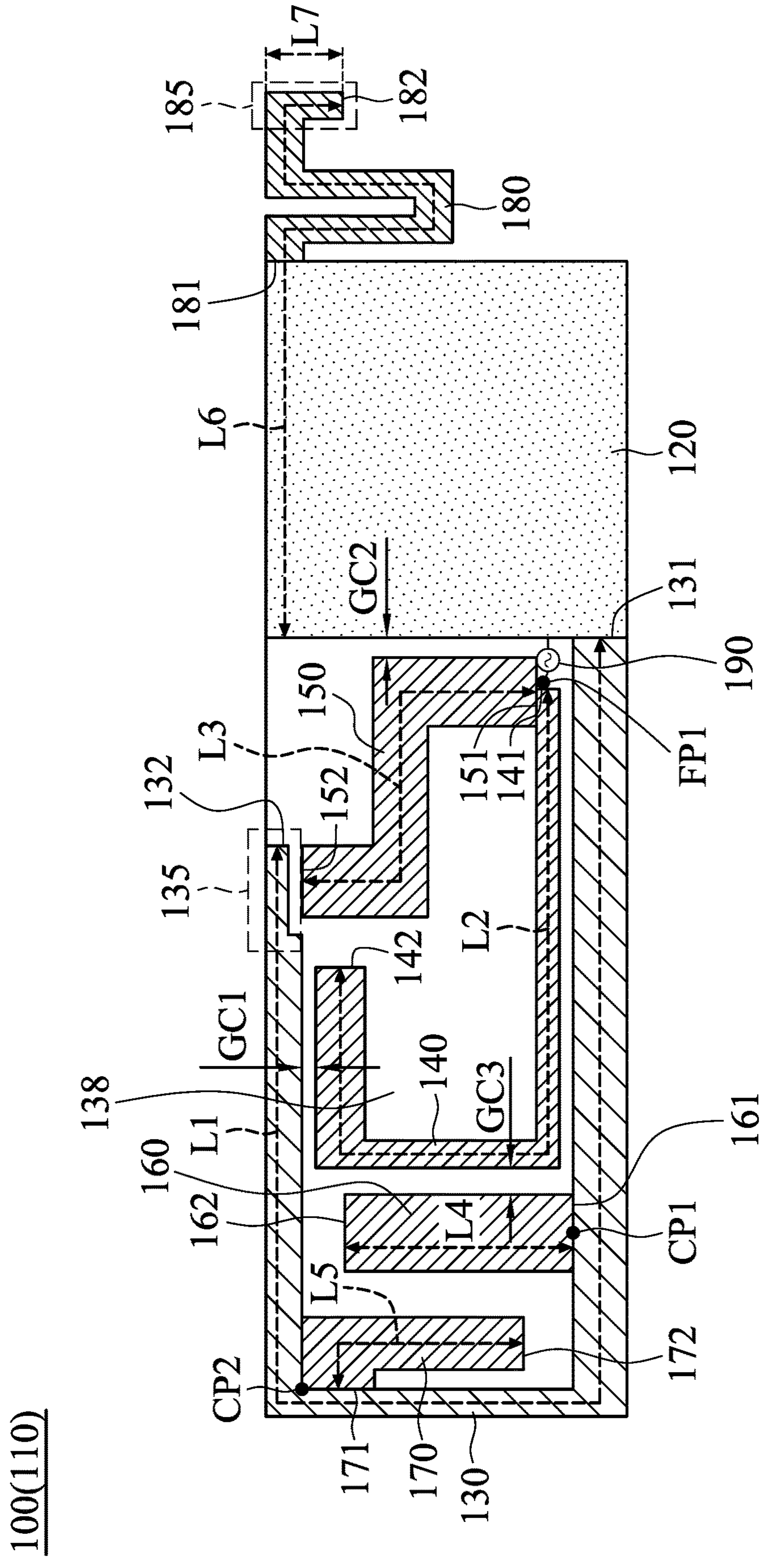
FIG. 1A is a diagram of an antenna system according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1A is a diagram of an antenna system 100 according to an embodiment of the invention. The antenna system 100 may be applied to a vehicle device or a mobile device, such as a smart phone, a tablet computer, or a notebook computer. As shown in FIG. 1A, the antenna system 100 at least includes a first antenna structure 110. The first antenna structure 110 includes a first ground element 120, a first radiation element 130, a second radiation element 140, a third radiation element 150, a fourth radiation element 160, and a fifth radiation element 170. The first ground element 120, the first radiation element 130, the second radiation element 140, the third radiation element 150, the fourth radiation element 160, and the fifth radiation element 170 may all be made of metal materials, such as copper, silver, aluminum, iron, or their alloys.

The first ground element 120 may substantially have a rectangular shape. In some embodiments, the first ground element 120 is implemented with a ground copper foil, which may be further coupled to a system ground plane (not shown) of the antenna system 100.

The first radiation element 130 may substantially have a U-shape. Specifically, the first radiation element 130 has a first end 131 and a second end 132. The first end 131 of the first radiation element 130 is coupled to the first ground element 120. The second end 132 of the first radiation element 130 is an open end. In some embodiments, a region 138 is defined by the first ground element 120 and the first radiation element 130. The region 138 may be hollow. The aforementioned region 138 may substantially have a rectangular shape. The second radiation element 140, the third radiation element 150, the fourth radiation element 160, and the fifth radiation element 170 may all be disposed inside the aforementioned region 138.

The second radiation element 140 may substantially have a J-shape, and it may be disposed between the fourth radiation element 160 and the third radiation element 150. Specifically, the second radiation element 140 has a first end 141 and a second end 142. A first feeding point FP1 is positioned at the first end 141 of the second radiation element 140. The second end 142 of the second radiation element 140 is an open end. The first feeding point FP1 may be further coupled to the positive electrode of a signal source 190. In an exemplary embodiment, the signal source 190 may be an RF (Radio Frequency) module for exciting the first antenna structure 110. The negative electrode of the signal source 190 may be coupled to the first ground element 120. In an exemplary embodiment, the second end 142 of the second radiation element 140 and the second end 132 of the first radiation element 130 may substantially extend in the same direction. In some embodiments, the second radiation element 140 is adjacent to the first radiation element 130. A first coupling gap GC1 may be formed between the second radiation element 140 and the first radiation element 130. In an exemplary embodiment, the first coupling gap GC1 may be adjacent to the first end 141 of the second radiation element 140, but it is not limited thereto. It should be noted that the term "adjacent" or "close" over the disclosure means that the distance (spacing) between two corresponding elements is smaller than a predetermined distance (e.g., 10 mm or the shorter), but often does not mean that the two corresponding elements directly touch each other (i.e., the aforementioned distance/spacing between them is reduced to 0).

The third radiation element 150 may substantially have an N-shape. Specifically, the third radiation element 150 has a first end 151 and a second end 152. The first end 151 of the third radiation element 150 is coupled to the first feeding point FP1. The second end 152 of the third radiation element 150 is an open end. In some embodiments, the first radiation element 130 further has a terminal notch 135 positioned at the second end 132, and the second end 152 of the third radiation element 150 at least partially extends into the terminal notch 135, so as to save the whole design area. In some embodiments, the third radiation element 150 is adjacent to the first ground element 120. A second coupling gap GC2 may be formed between the third radiation element 150 and the first ground element 120.

The fourth radiation element 160 may substantially have a straight-line shape, which may be disposed between the fifth radiation element 170 and the second radiation element 140. Specifically, the fourth radiation element 160 has a first end 161 and a second end 162. The first end 161 of the fourth radiation element 160 is coupled to a first connection point CP1 on the first radiation element 130. The second end 162 of the fourth radiation element 160 is an open end. In an exemplary embodiment, the second end 162 of the fourth radiation element 160 and the second end 152 of the third radiation element 150 may substantially extend in the same direction. In some embodiments, the fourth radiation element 160 is adjacent to the second radiation element 140. A third coupling gap GC3 may be formed between the fourth radiation element 160 and the second radiation element 140. It should be understood that the fourth radiation element 160 is merely an optional element, which is removed from the first antenna structure 110 in other embodiments.

The fifth radiation element 170 may substantially have an L-shape. Specifically, the fifth radiation element 170 has a first end 171 and a second end 172. The first end 171 of the fifth radiation element 170 is coupled to a second connection point CP2 on the first radiation element 130. The second end 172 of the fifth radiation element 170 is an open end. In an exemplary embodiment, the second end 172 of the fifth radiation element 170 and the second end 162 of the fourth radiation element 160 may substantially extend in opposite directions and away from each other. The second connection point CP2 may be different from the aforementioned first connection point CP1. In an exemplary embodiment, the second connection point CP2 may be positioned at a right-angle bending portion of the first radiation element 130, but it is not limited thereto. It should be understood that the fifth radiation element 170 is merely an optional element, which is removed from the first antenna structure 110 in other embodiments.

In some embodiments, the first ground element 120 further includes a first extension branch 180. In an exemplary embodiment, the first extension branch 180 may substantially have a meandering shape. Specifically, the first extension branch 180 has a first end 181 and a second end 182. The first end 181 of the first extension branch 180 is coupled to a corner of the first ground element 120. The second end 182 of the first extension branch 180 is an open end. In some embodiments, the first extension branch 180 further includes a first bending portion 185 positioned at the second end 182. In an exemplary embodiment, the first bending portion 185 of the first extension branch 180 may substantially have a straight-line shape or an L-shape, but it is not limited thereto.

Figure 1B:
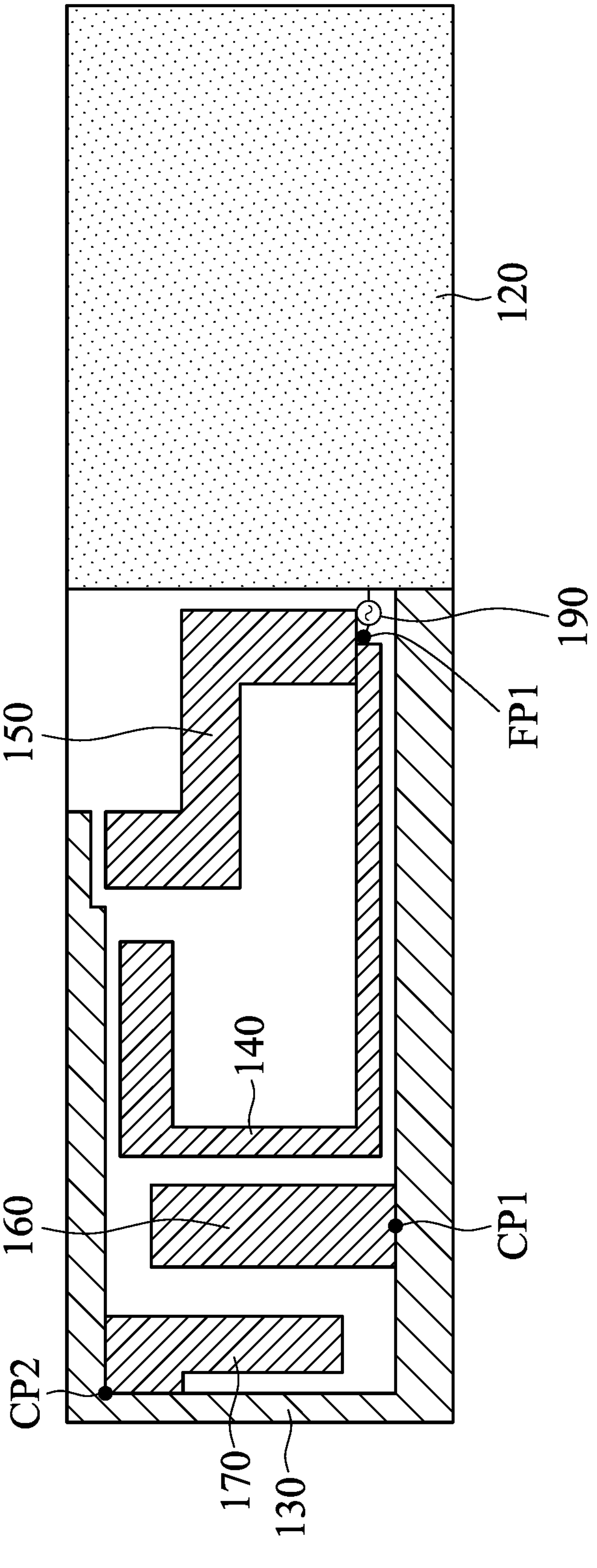
FIG. 1B is a diagram of an antenna system according to another embodiment of the invention.

FIG. 1B is a diagram of an antenna system 100 according to another embodiment of the invention. In the embodiment of FIG. 1B, if the first extension branch 180 is removed, it will be occupied by the first ground element 120, and the size of the first ground element 120 will be slightly increased. According to practical measurements, the first antenna structure 110 of FIG. 1B can provide similar levels of performance.

In some embodiments, the first antenna structure 110 of the antenna system 100 is a planar antenna structure, which is disposed on a dielectric substrate (not shown), such as an FR4 (Flame Retardant 4) substrate or a PCB (Printed Circuit Board). In alternative embodiments, the first antenna structure 110 of the antenna system 100 is disposed on an FPC (Flexible Printed Circuit), but it is not limited thereto.

Figure 2:
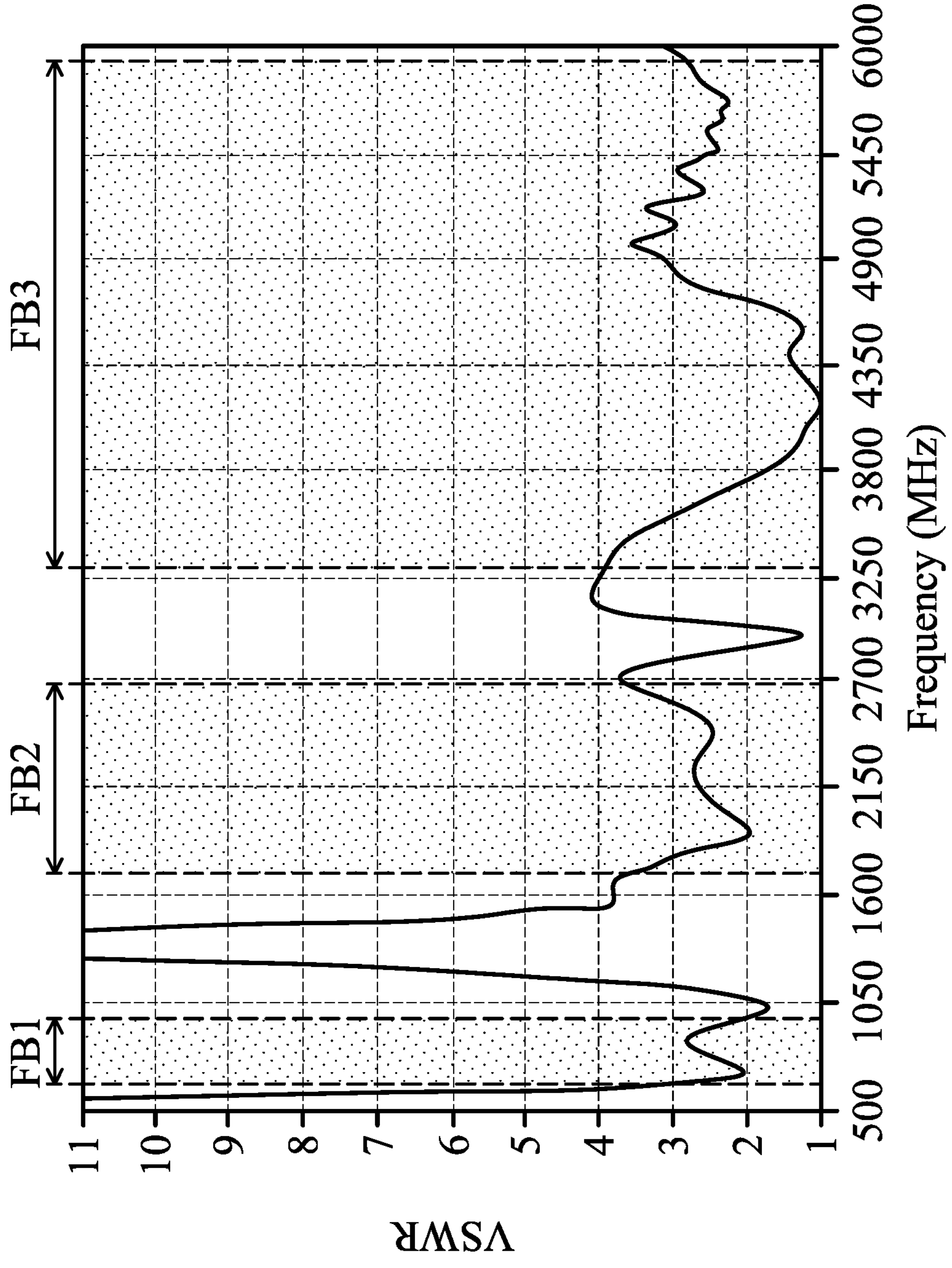
FIG. 2 is a diagram of VSWR (Voltage Standing Wave Ratio) of a first antenna structure of an antenna system according to an embodiment of the invention.

FIG. 2 is a diagram of VSWR (Voltage Standing Wave Ratio) of the first antenna structure 110 of the antenna system 100 according to an embodiment of the invention. The horizontal axis represents the operational frequency (MHz), and the vertical axis represents the VSWR. According to the measurement of FIG. 2, the first antenna structure 110 of the antenna system 100 can cover a first frequency band FB1, a second frequency band FB2, and a third frequency band FB3. In an exemplary embodiment, the first frequency band FB1 may be from 617 MHz to 960 MHz, the second frequency band FB2 may be from 1710 MHz to 2690 MHz, and the third frequency band FB3 may be from 3300 MHz to 5925 MHz. Therefore, the first antenna structure 110 of the antenna system 100 can support at least the wideband operations of LTE (Long Term Evolution).

In some embodiments, the operational principles of the antenna system 100 will be described as follows. The first radiation element 130 and the second radiation element 140 can be excited to generate the first frequency band FB1. The second radiation element 140 can be excited to generate the second frequency band FB2. The third radiation element 150 can be excited to generate the third frequency band FB3. The fourth radiation element 160 is configured to fine-tune the impedance matching of the second frequency band FB2, thereby increasing the operational bandwidth thereof. In addition, the fifth radiation element 170 is configured to fine-tune the impedance matching of the third frequency band FB3, thereby increasing the operational bandwidth thereof.

In some embodiments, the element sizes of the antenna system 100 will be described as follows. The length L1 of the first radiation element 130 may be substantially equal to 0.5 wavelength ($\lambda/2$) of the first frequency band FB1 of the antenna system 100. The length L2 of the second radiation element 140 may be substantially equal to 0.5 wavelength ($\lambda/2$) of the second frequency band FB2 of the antenna system 100. The length L3 of the third radiation element 150 may be substantially equal to 0.5 wavelength ($\lambda/2$) of the third frequency band FB3 of the antenna system 100. The length L4 of the fourth radiation element 160 may be from 10 mm to 15 mm. The length L5 of the fifth radiation element 170 may be from 10 mm to 15 mm. The total length L6 of the first ground element 120 and the first extension branch 180 may be substantially equal to 0.25 wavelength ($\lambda/4$) of the first frequency band FB1 of the antenna system 100. The length L7 of the first bending portion 185 of the first extension branch 180 may be from 4 mm to 10 mm. The width of the first coupling gap GC1 may be less than or equal to 1 mm. The width of the second coupling gap GC2 may be from 0.5 mm to 2.5 mm. The width of the third coupling gap GC3 may be less than or equal to 5 mm. The above ranges of element sizes are calculated and obtained according to many experimental results, and they help to optimize the operational bandwidth and impedance matching of the antenna system 100.

The following embodiments will introduce different configurations and detailed structural features of the antenna system 100. It should be understood that these figures and descriptions are merely exemplary, rather than limitations of the invention.

Figure 3:
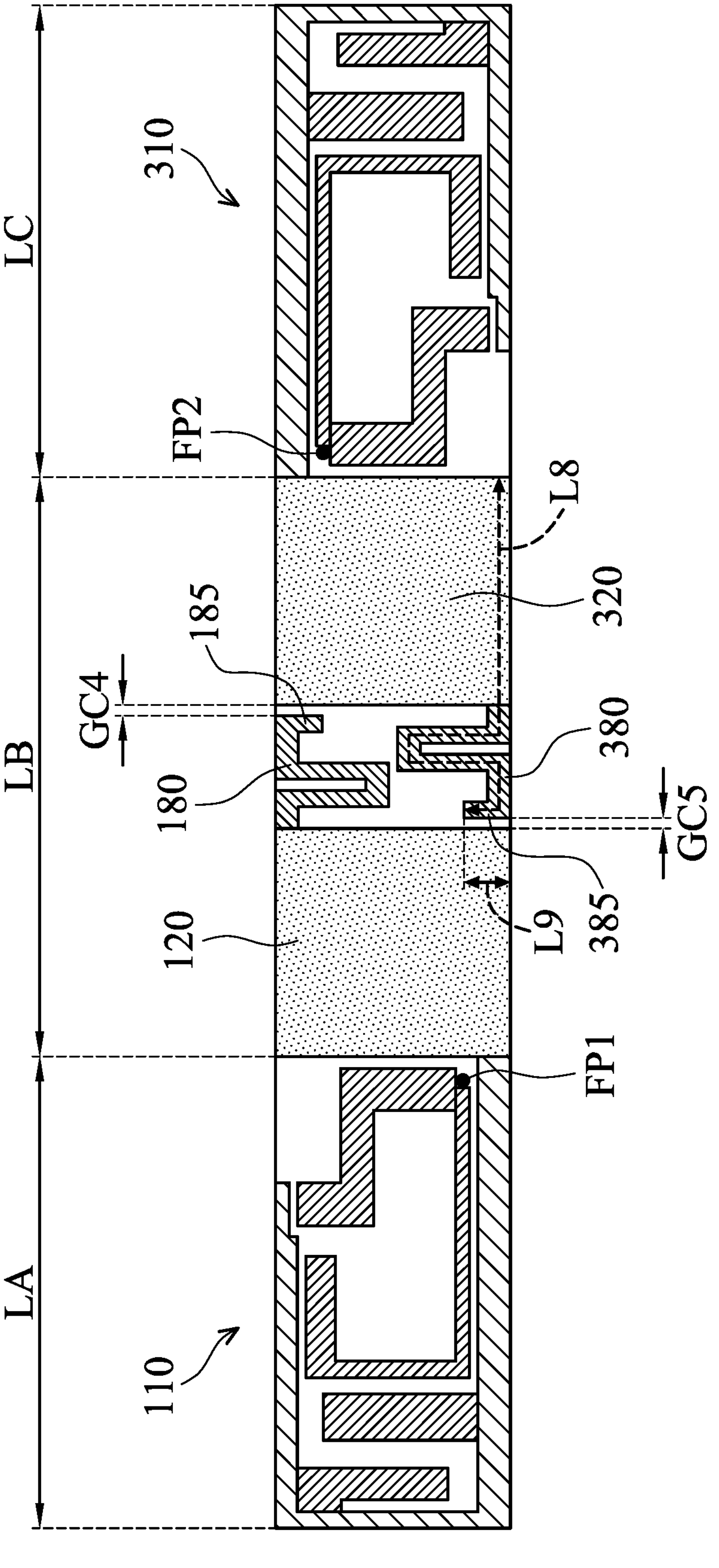
FIG. 3 is a diagram of an antenna system according to an embodiment of the invention.

FIG. 3 is a diagram of an antenna system 300 according to an embodiment of the invention. FIG. 3 is similar to FIG. 1A. In the embodiment of FIG. 3, besides the first antenna structure 110, the antenna system 300 further includes a second antenna structure 310. Specifically, the second antenna structure 310 has a second feeding point FP2, and includes a second ground element 320 and other corresponding radiation elements. The second feeding point FP2 may be further coupled to another signal source (not shown). For example, the aforementioned signal source may be another RF module for exciting the second antenna structure 310. Generally, the second antenna structure 310 is symmetrical to the first antenna structure 110 with respect to the central point of the antenna system 300 (i.e., point symmetry). Similarly, the second ground element 320 further includes a second extension branch 380. In an exemplary embodiment, the second extension branch 380 may substantially have a different meandering shape, and it may further include a second bending portion 385. In some embodiments, a fourth coupling gap GC4 is formed between the second ground element 320 and the first bending portion 185 of the first extension branch 180, and a fifth coupling gap GC5 is formed between the first ground element 120 and the second bending portion 385 of the second extension branch 380. It should be understood that if the antenna system 300 includes both of the first antenna structure 110 and the second antenna structure 310, the antenna system 300 can support the function of MIMO (Multi-Input and Multi-Output). Other features of the antenna system 300 of FIG. 3 are similar to those of the antenna system 100 of FIG. 1A. Therefore, the two embodiments can achieve similar levels of performance.

Figure 4:
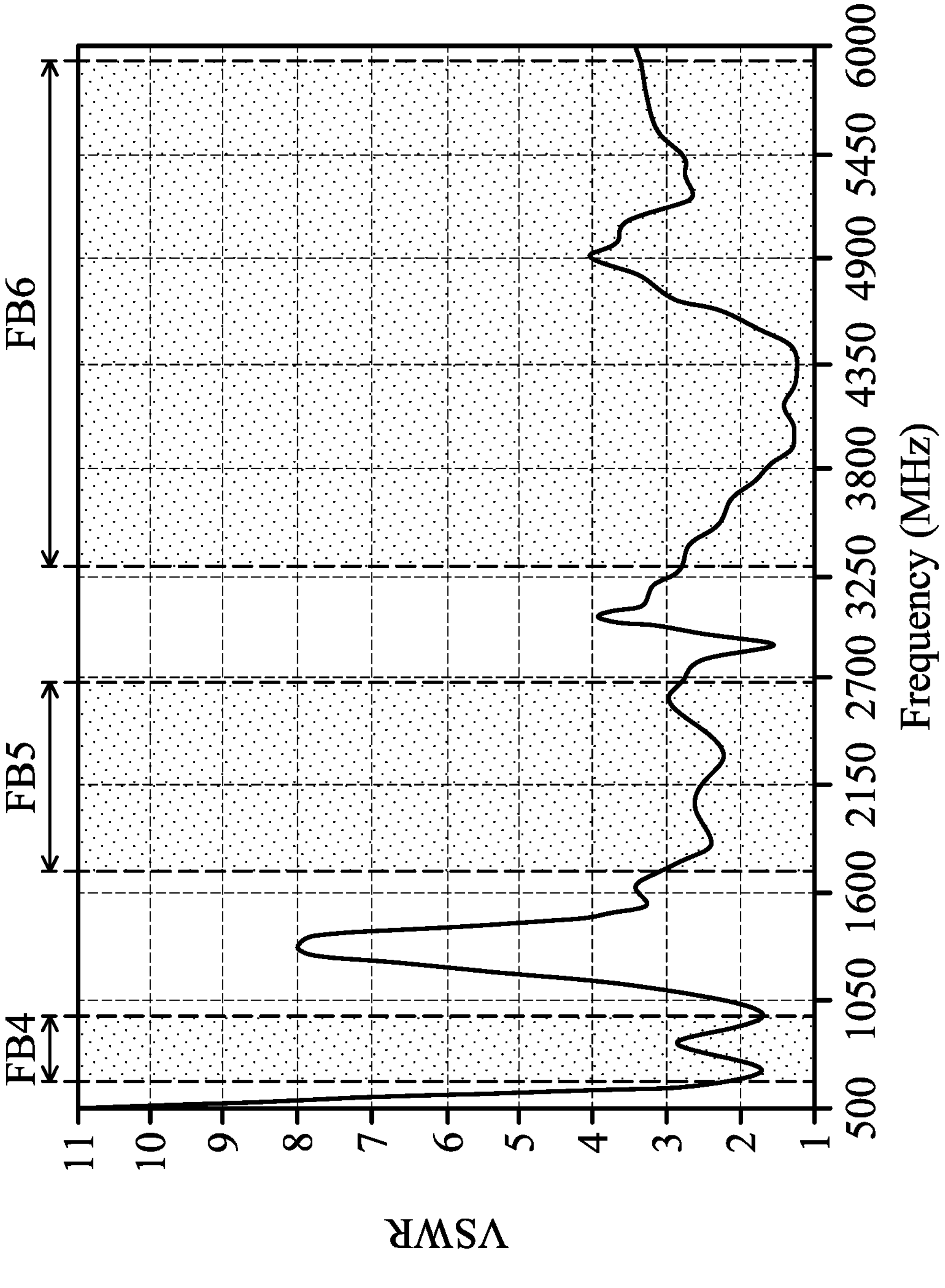
FIG. 4 is a diagram of VSWR of a second antenna structure of an antenna system according to an embodiment of the invention.

FIG. 4 is a diagram of VSWR of the second antenna structure 310 of the antenna system 300 according to an embodiment of the invention. The horizontal axis represents the operational frequency (MHz), and the vertical axis represents the VSWR. According to the measurement of FIG. 4, the second antenna structure 310 of the antenna system 300 can cover a first frequency band FB4, a second frequency band FB5, and a third frequency band FB6. For example, the first frequency band FB4 may be from 617 MHz to 960 MHz, the second frequency band FB5 may be from 1710 MHz to 2690 MHz, and the third frequency band FB6 may be from 3300 MHz to 5925 MHz. Therefore, the second antenna structure 310 of the antenna system 300 can support at least the wideband operations of LTE.

Figure 5:
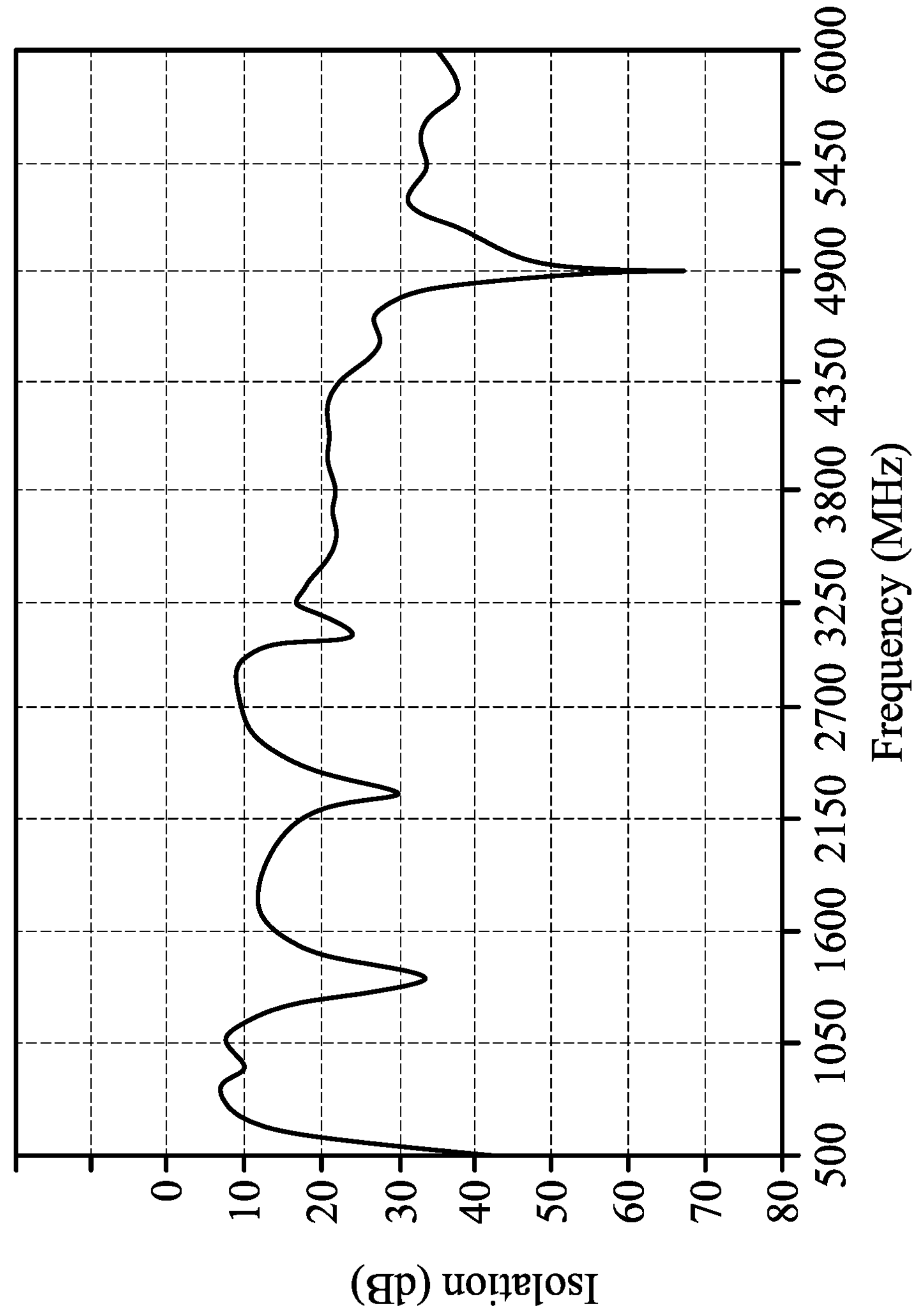
FIG. 5 is a diagram of isolation between a first antenna structure and a second antenna structure of an antenna system according to an embodiment of the invention.

FIG. 5 is a diagram of the isolation between the first antenna structure 110 and the second antenna structure 310 of the antenna system 300 according to an embodiment of the invention. The horizontal axis represents the operational frequency (MHz), and the vertical axis represents the isolation (dB). For example, if the first feeding point FP1 is set as a first port (Port 1) and the second feeding point FP2 is set as a second port (Port 2), the absolute value of the S21 parameter between the first port and the second port can be considered as the isolation between the first antenna structure 110 and the second antenna structure 310. According to the measurement of FIG. 5, the isolation of the antenna system 300 can reach 10 dB or higher within the first frequency band FB4, the second frequency band FB5, and the third frequency band FB6 as mentioned above. It should be noted that in the antenna system 300, the second ground element 320 and the second extension branch 380 are completely separate from the first ground element 120 and the first extension branch 180. According to practical measurements, such a non-common-grounding design can help to increase the isolation between the first antenna structure 110 and the second antenna structure 310 within the aforementioned first frequency band FB4.

In some embodiments, the element sizes of the antenna system 300 will be described as follows. The total length L8 of the second ground element 320 and the second extension branch 380 may be substantially equal to 0.25 wavelength (λ/4) of the first frequency band FB4 of the antenna system 300. The length L9 of the second bending portion 385 of the second extension branch 380 may be from 4 mm to 10 mm. The width of the fourth coupling gap GC4 may be from 0.5 mm to 1 mm. The width of the fifth coupling gap GC5 may be from 0.5 mm to 1 mm. Furthermore, the length LA of the first antenna structure 110 excluding the first ground element 120, the total length LB of the first ground element 120 and the second ground element 320, and the length LC of the second antenna structure 310 excluding the second ground element 320 may substantially equal to each other. The above ranges of element sizes are calculated and obtained according to many experimental results, and they help to optimize the isolation between the first antenna structure 110 and the second antenna structure 310 of the antenna system 300.

Figure 6:
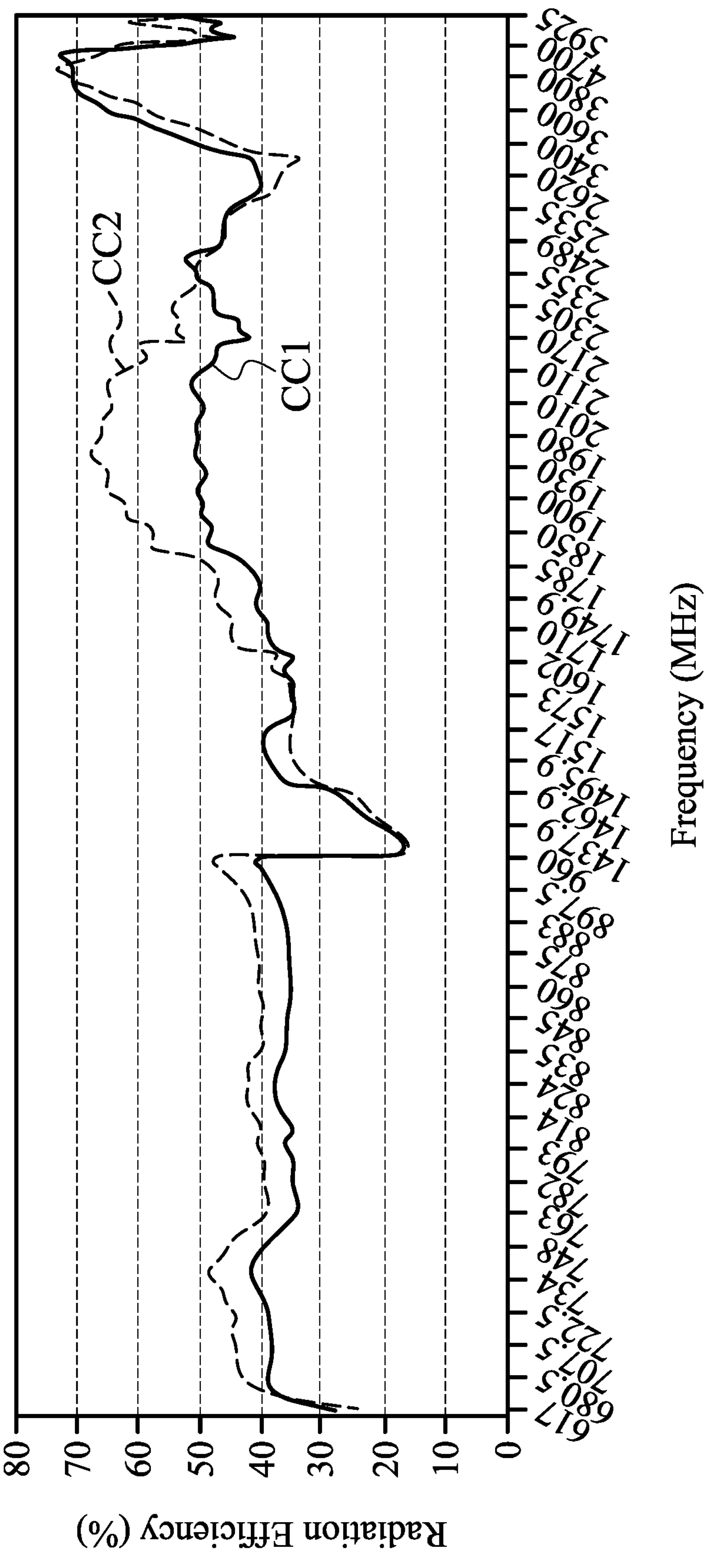
FIG. 6 is a diagram of radiation efficiency of an antenna system according to an embodiment of the invention.

FIG. 6 is a diagram of radiation efficiency of the antenna system 300 according to an embodiment of the invention. The horizontal axis represents the operational frequency (MHz), and the vertical axis represents the radiation efficiency (%). As shown in FIG. 6, a first curve CC1 represents the operational characteristics of the first antenna structure 110 of the antenna system 300, and a second curve CC2 represents the operational characteristics of the second antenna structure 310 of the antenna system 300. According to the measurement of FIG. 6, the radiation efficiency of the antenna system 300 can reach at least 40% within the first frequency band, the second frequency band, and the third frequency band as mentioned above, and it can meet the requirements of practical application of general communication or vehicle devices.

Figure 7:
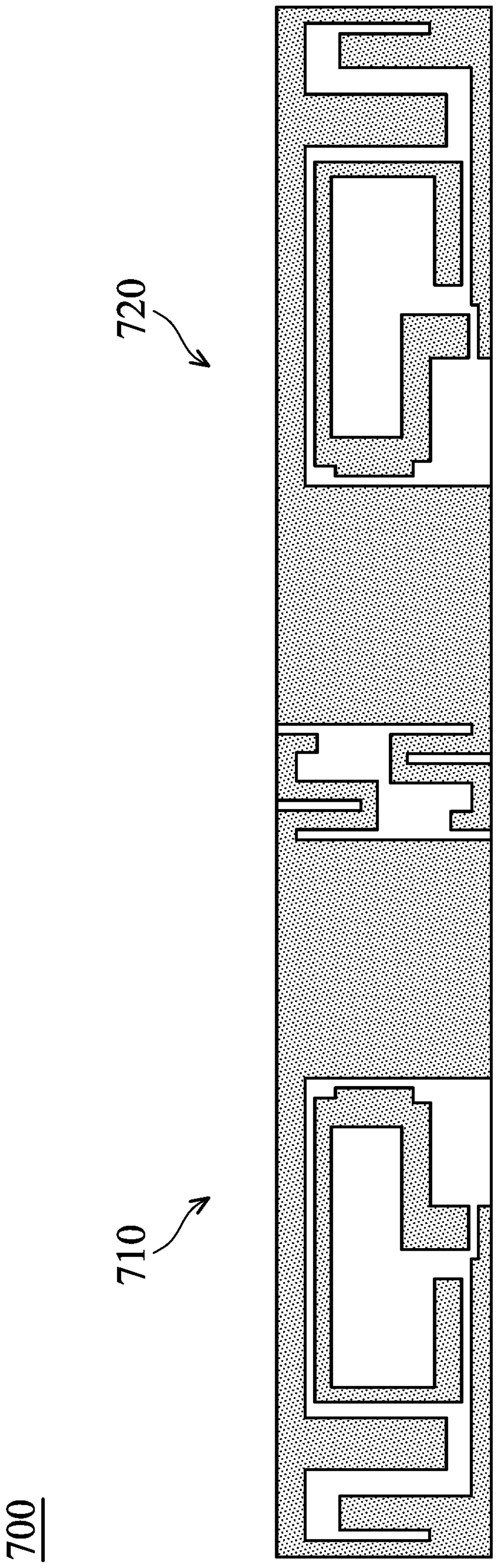
FIG. 7 is a diagram of an antenna system according to an embodiment of the invention.

FIG. 7 is a diagram of an antenna system 700 according to an embodiment of the invention. FIG. 7 is similar to FIG. 3. In the embodiment of FIG. 7, the antenna system 700 includes a first antenna structure 710 and a second antenna structure 720, and the second antenna structure 720 is symmetrical to the first antenna structure 710 with respect to the central axis of the antenna system 700 (i.e., line symmetry). Other features of the antenna system 700 of FIG. 7 are similar to those of the antenna system 300 of FIG. 3. Therefore, the two embodiments can achieve similar levels of performance.

The invention proposes a novel antenna system. In comparison to the conventional design, the invention has at least the advantages of smaller size, wider bandwidth, higher isolation, and lower manufacturing cost. Therefore, the invention is suitable for application in a variety of communication devices, especially for vehicle devices.

Note that the above element sizes, element shapes, element parameters, and frequency ranges are not limitations of the invention. An antenna designer can fine-tune these settings or values in order to meet specific requirements. It should be understood that the antenna system of the invention is not limited to the configurations depicted in FIGS. 1-7. The invention may merely include any one or more features of any one or more embodiments of FIGS. 1-7. In other words, not all of the features displayed in the figures should be implemented in the antenna system of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna system, comprising:

a first antenna structure, comprising:

a first ground element;

a first radiation element, coupled to the first ground element, wherein a region is defined by the first ground element and the first radiation element;

a second radiation element, having a first feeding point, wherein the second radiation element is adjacent to the first radiation element; and a third radiation element, coupled to the first feeding point, wherein the third radiation element is adjacent to the first ground element;

wherein the second radiation element and the third radiation element are disposed inside the region;

wherein an open end of the third radiation element extends toward an open end of the first radiation element;

wherein an open end of the second radiation element extends toward the third radiation element;

wherein the first ground element further comprises a first extension branch, and the first extension branch has a meandering shape;

wherein the antenna system further comprises:

a second antenna structure, comprising a second ground element, wherein the second antenna structure is symmetrical to the first antenna structure;

wherein the second ground element further comprises a second extension branch, and the second extension branch has another meandering shape.

2. The antenna system as claimed in claim 1, wherein the first antenna structure further comprises:

a fourth radiation element, coupled to a first connection point on the first radiation element, wherein the fourth radiation element is adjacent to the second radiation element.

3. The antenna system as claimed in claim 2, wherein the first antenna structure further comprises:

a fifth radiation element, coupled to a second connection point on the first radiation element, wherein the fourth radiation element and the fifth radiation element are disposed inside the region.

4. The antenna system as claimed in claim 2, wherein a third coupling gap is formed between the fourth radiation element and the second radiation element, and a width of the third coupling gap is less than or equal to 5 mm.

5. The antenna system as claimed in claim 1, wherein a first coupling gap is formed between the second radiation element and the first radiation element, and a width of the first coupling gap is less than or equal to 1 mm.

6. The antenna system as claimed in claim 1, wherein a second coupling gap is formed between the third radiation element and the first ground element, and a width of the second coupling gap is from 0.5 mm to 2.5 mm.

7. The antenna system as claimed in claim 1, wherein the antenna system covers a first frequency band, a second frequency band, and a third frequency band.

8. The antenna system as claimed in claim 7, wherein the first frequency band is from 617 MHz to 960 MHz, the second frequency band is from 1710 MHz to 2690 MHz, and the third frequency band is from 3300 MHz to 5925 MHz.

9. The antenna system as claimed in claim 7, wherein a length of the first radiation element is equal to 0.5 wavelength of the first frequency band.

10. The antenna system as claimed in claim 7, wherein a length of the second radiation element is equal to 0.5 wavelength of the second frequency band.

11. The antenna system as claimed in claim 7, wherein a length of the third radiation element is equal to 0.5 wavelength of the third frequency band.

12. The antenna system as claimed in claim 7, wherein a total length of the first ground element and the first extension branch is equal to 0.25 wavelength of the first frequency band.

13. The antenna system as claimed in claim 7, wherein a total length of the second ground element and the second extension branch is equal to 0.25 wavelength of the first frequency band.

14. The antenna system as claimed in claim 7, wherein a fourth coupling gap is formed between the second ground element and the first extension branch, and a width of the fourth coupling gap is from 0.5 mm to 1 mm.

15. The antenna system as claimed in claim 7, wherein a fifth coupling gap is formed between the first ground element and the second extension branch, and a width of the fifth coupling gap is from 0.5 mm to 1 mm.

16. The antenna system as claimed in claim 1, wherein the second antenna structure is symmetrical to the first antenna structure with respect to a central point of the antenna system.

17. An antenna system, comprising:

a first antenna structure, comprising:

a first ground element;

a first radiation element, coupled to the first ground element, wherein a region is defined by the first ground element and the first radiation element;

a second radiation element, having a first feeding point, wherein the second radiation element is adjacent to the first radiation element;

a third radiation element, coupled to the first feeding point, wherein the third radiation element is adjacent to the first ground element; and a fourth radiation element, directly connected to a first connection point on the first radiation element, wherein the fourth radiation element is adjacent to the second radiation element;

wherein the second radiation element and the third radiation element are disposed inside the region;

wherein the first ground element further comprises a first extension branch, and the first extension branch has a meandering shape;

wherein the antenna system further comprises:

a second antenna structure, comprising a second ground element, wherein the second antenna structure is symmetrical to the first antenna structure;

wherein the second ground element further comprises a second extension branch, and the second extension branch has another meandering shape.

* * * * *